US008587890B2

(12) United States Patent
Bui et al.

(10) Patent No.: US 8,587,890 B2
(45) Date of Patent: Nov. 19, 2013

(54) TAPE DRIVE PROVIDED WRITE FORMAT FOR OVERWRITE ERASURE OF MAGNETIC TAPE DATA RECORDED IN TRACKS

(75) Inventors: Nhan Xuan Bui, Tucson, AZ (US); Edwin Ralph Childers, Tucson, AZ (US); Reed Alan Hancock, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 201 days.

(21) Appl. No.: 13/229,407

(22) Filed: Sep. 9, 2011

(65) Prior Publication Data

US 2013/0063836 A1 Mar. 14, 2013

(51) Int. Cl.
G11B 5/03 (2006.01)
G11B 5/09 (2006.01)
G11B 5/584 (2006.01)

(52) U.S. Cl.
USPC .............................. 360/66; 360/48; 360/77.12

(58) Field of Classification Search
None
See application file for complete search history.

(56) References Cited

U.S. PATENT DOCUMENTS 7,349,118 B2 * 3/2008 Zipprich et al. ............. 358/1.16
2011/0051277 A1 3/2011 Bradshaw

* cited by examiner

Primary Examiner — Regina N Holder
(74) Attorney, Agent, or Firm — John H. Holcombe (57) ABSTRACT

A magnetic tape drive has a drive system to move a magnetic tape longitudinally; servo head(s) for reading servo band information from a magnetic tape as the magnetic tape is moved longitudinally; a magnetic tape read write head configured to read and to write the magnetic tape, having a data write width (w) greater than a normal shingled track pitch width (p) of the magnetic tape; an actuator system for positioning the read write head laterally; and a control. The magnetic tape drive stores an overwrite erase format of non-shingled track pitch longitudinal pattern(s) whose pitch is greater than the normal shingled track pitch width (p); and, the control, in response to activation of overwrite erasure of the tape drive, operates the actuator system and the magnetic tape read write head to write non-data to magnetic tape in the stored overwrite erase format.

15 Claims, 7 Drawing Sheets

Control the erase head to move as trianglewave or sinewave
Only 2 moves to wipe out the whole databand, 1 Forward, 1 Backward

FIG. 10

Typical 8 wraps write shingling
With 40% pitch overwrite

Edge to edge erase with old drive
having wider writer width

FIG. 11

TAPE DRIVE PROVIDED WRITE FORMAT FOR OVERWRITE ERASURE OF MAGNETIC TAPE DATA RECORDED IN TRACKS

FIELD OF THE INVENTION

This invention relates to erasure of data recorded in tracks of magnetic tape.

BACKGROUND OF THE INVENTION

When a magnetic tape user determines that data stored on the magnetic tape is no longer needed, there is often a security need to destroy or erase the data before relinquishing control over the tape. It may also be useful and provide cost savings to preserve the servo information on the tape so that the tape may be reused. The servo information is written to the tape during manufacture of a tape cartridge in a precision servo formatting operation. Potential re-use of the tape prevents use of "bulk erase" processes which would erase both the data and the servo information. A current method of erasing data without erasing the servo information comprises providing a special erase tape drive with erase heads specifically designed and arranged to erase the data area. Another method is to provide an application for a host system to write data that is useless or that comprises a special pattern to the tape, but this is time consuming and expensive because of the involvement of the host system to access the tape drive and do the writing to every track of the magnetic tape that has data recorded thereon.

SUMMARY OF THE INVENTION

Magnetic tape drives provide methods, computer program products and apparatus for normal tape drives to overwrite erase data recorded in tracks of magnetic tape without involvement by host systems.

In one embodiment, the magnetic tape drive comprises a drive system to move a magnetic tape longitudinally; a normal magnetic tape read write head configured to read and to write with respect to the magnetic tape, having a data write width (w) greater than a shingled track pitch width (p) of the magnetic tape; a read/write and servo system configured to employ servo band information to position the read write head laterally with respect to the magnetic tape; storage and a control.

The magnetic tape drive stores an overwrite erase format, the format comprising at least one non-shingled track pitch longitudinal pattern whose pitch is greater than the shingled track pitch width (p); and, the control, in response to activation of overwrite erasure of the tape drive, operates the read/write and servo system and the magnetic tape read write head to write non-data to magnetic tape with the normal data write head in the stored overwrite erase format.

In a further embodiment, the non-shingled track pitch longitudinal pattern comprises nominal shingled track pitch (p) index values, and adjusts a stop-write threshold to a value at least twice normal.

In another embodiment, the non-shingled track pitch longitudinal pattern comprises track pitch index values substantially equal to the write width (w) of the tape drive.

In still another embodiment, the non-shingled track pitch longitudinal pattern comprises track pitch index values greater than a write width (w) of the tape drive, up to substantially 1.5 times the write width (w).

In a further embodiment, the control additionally operates the drive system to move the magnetic tape at higher than normal linear tape speed while writing the non-shingled track pitch longitudinal pattern.

In another embodiment, wherein the magnetic tape comprises longitudinal servo bands separated by data bands of tracks of the magnetic tape, the non-shingled track pitch longitudinal pattern comprises a component lateral to the tracks of the magnetic tape, the lateral component limited to maintain the pattern within the data bands of the tracks of the magnetic tape.

In a further embodiment, the lateral component comprises a zig-zag pattern.

In another embodiment, the lateral component comprises a sine-wave pattern.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
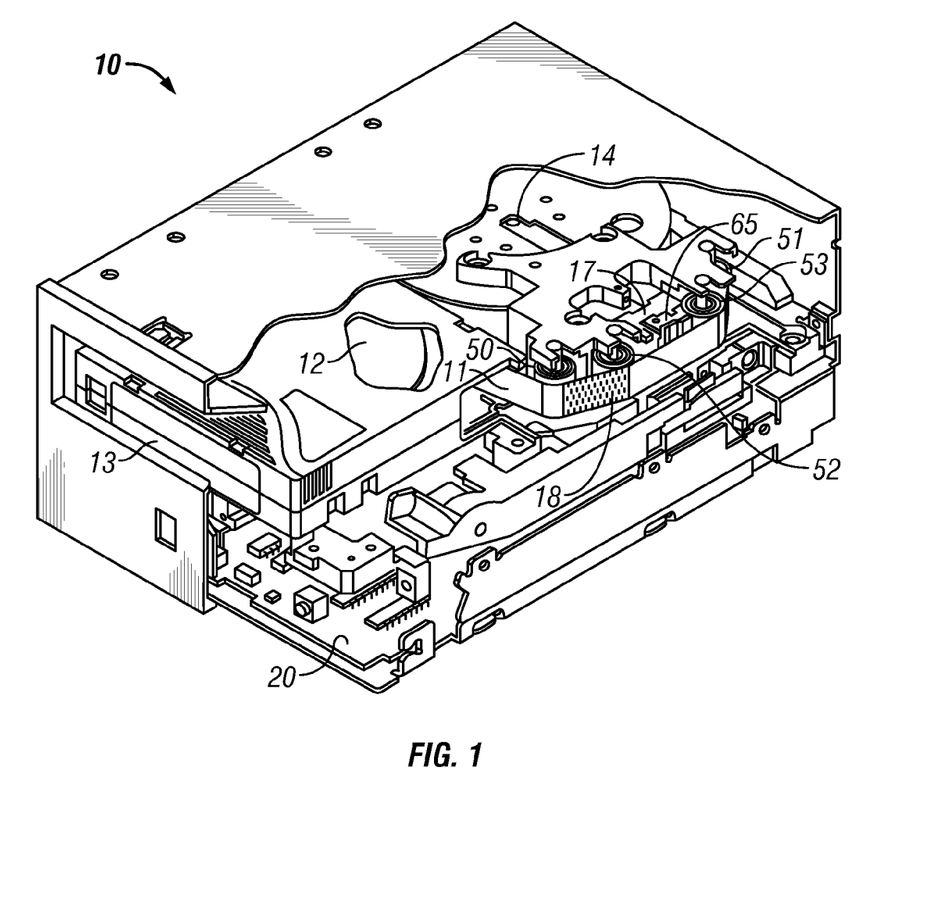
FIG. 1 is a partially cut away view of an exemplary tape drive with a tape cartridge and magnetic tape which may implement aspects of the present invention.

FIG. 1 illustrates an example of a tape drive 10, which may comprise a magnetic tape data storage drive which writes data 18 to and reads data from an elongate tape 11 which may comprise magnetic tape data storage media. As is understood by those of skill in the art, magnetic tape data storage drives, also called magnetic tape drives or tape drives, may take any of various forms. The illustrated magnetic tape drive 10 moves the magnetic tape 11 along a tape path in the longitudinal direction of the tape from a supply reel 12 in a magnetic tape data storage cartridge 13 to a take up reel 14. An example of a magnetic tape drive is the IBM® LTO (Linear Tape Open) magnetic tape drive.

The magnetic tape media 11 is moved in the longitudinal direction across a read/write and servo tape head 65. The tape head may be supported and laterally moved by an actuator 17 of a track following servo system. The magnetic tape media is supported by roller tape guides 50, 51, 52, 53, while the magnetic tape media is moved longitudinally.

A typical magnetic tape data storage drive operates in both the forward and reverse directions to read and write data. Thus, the magnetic tape head 65 may comprise one set of read and write elements for operating in the forward direction and another set for operating in the reverse direction, or alternatively, may have two sets of the read elements on either side of the write elements to allow the same write elements to write in both directions while the two sets of read elements allow a read-after-write in both directions.

Figure 2:
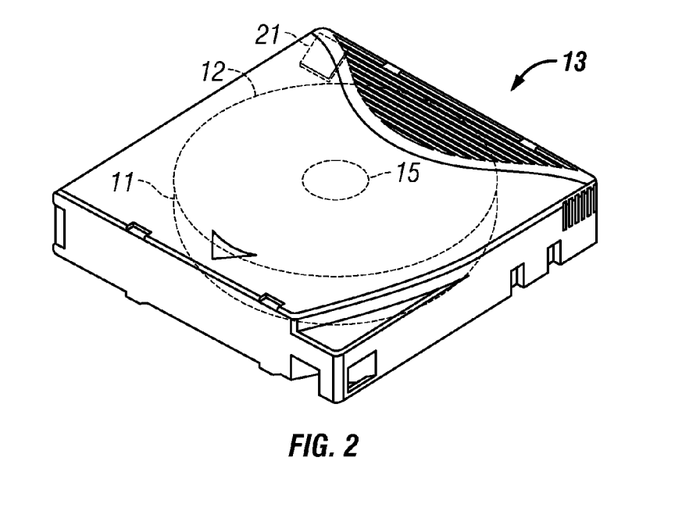
FIG. 2 is view of the tape cartridge of FIG. 1.

Referring to FIG. 2, the single reel tape cartridge 13 comprising magnetic tape 11, is illustrated wherein the magnetic tape 11 is wound on a hub 15 of reel 12. A cartridge memory 21 may store information regarding the data storage cartridge and, for example, comprises a transponder.

Figure 3:
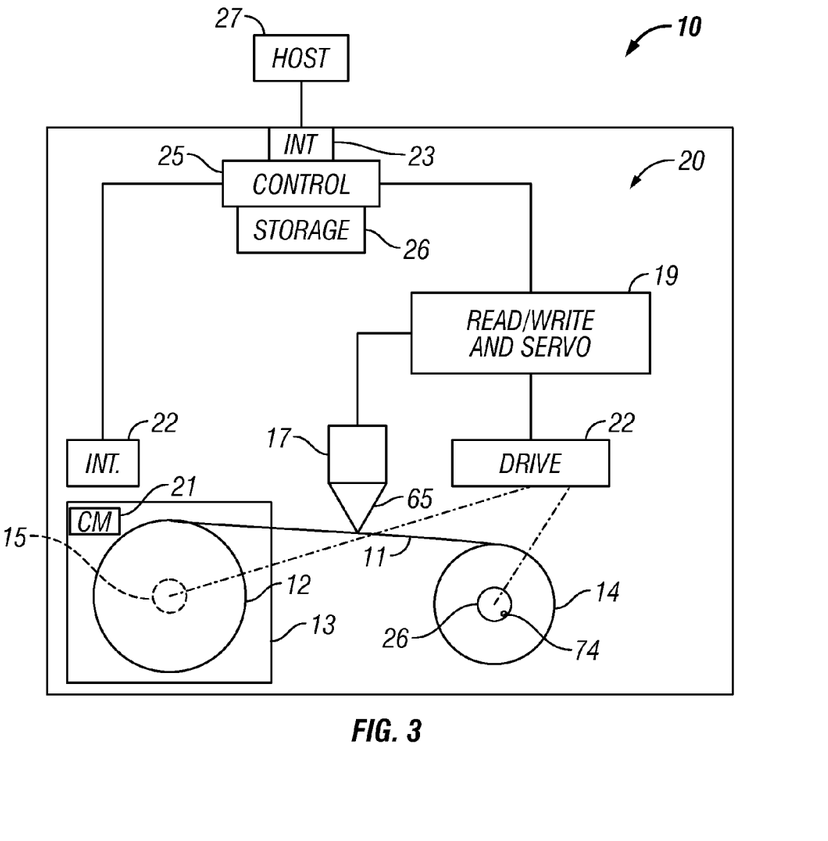
FIG. 3 is a schematic view of the tape drive with a tape cartridge and magnetic tape of FIG. 1.

Referring to FIG. 3, the magnetic tape drive 10 is illustrated wherein the magnetic tape 11 is wound on reel 12 in the cartridge 13, and, when loaded in the magnetic tape drive 10, is fed between the cartridge reel and a take up reel 14 in the magnetic tape drive.

The magnetic tape drive comprises a memory interface 22 for reading information from, and writing information to, the cartridge memory 21 of the magnetic tape cartridge 13. A read/write system is provided for reading and writing information to the magnetic tape, and, for example, may comprise a read/write and servo head system 65 with a servo actuator 17 for moving the head laterally of the magnetic tape 11, a read/write servo system 19, and a drive system 22 which moves the magnetic tape 11 between the cartridge reel 12 and the take up reel 14 and across the read/write and servo head system 65. The read/write and servo system 19 also controls the operation of the drive motor system 22 to move the magnetic tape 11 across the read/write and servo head system 65 at a desired velocity, and, in one example, determines the lateral location of the read/write and servo head system with respect to the magnetic tape 11, and, in another example, determines the longitudinal position of the tape 11 by reading the tape servo tracks, for example, called "LPOS" (Longitudinal POSition), and in another example, the read/write and servo system 19 employs signals from the reel motors to determine the location of the read/write and servo head system with respect to the magnetic tape 11.

An interface 23 provides communication with respect to one or more host systems or processors 27, and is configured to receive and to send information externally of the data storage drive. Alternatively, the tape drive 10 may form part of a subsystem, such as a library, and may also receive commands from the subsystem, also at interface 23.

A control 25 communicates with the host interface 23, with memory interface 18, and communicates with the read/write system, e.g., at read/write and servo system 19. The illustrated embodiments of tape drives are known to those of skill in the art.

Other types of removable data storage cartridges and tape drives are known to those of skill in the art. Examples comprise two reel magnetic tape cartridges and drives, and comprise optical tape cartridges and drives.

Figure 4:
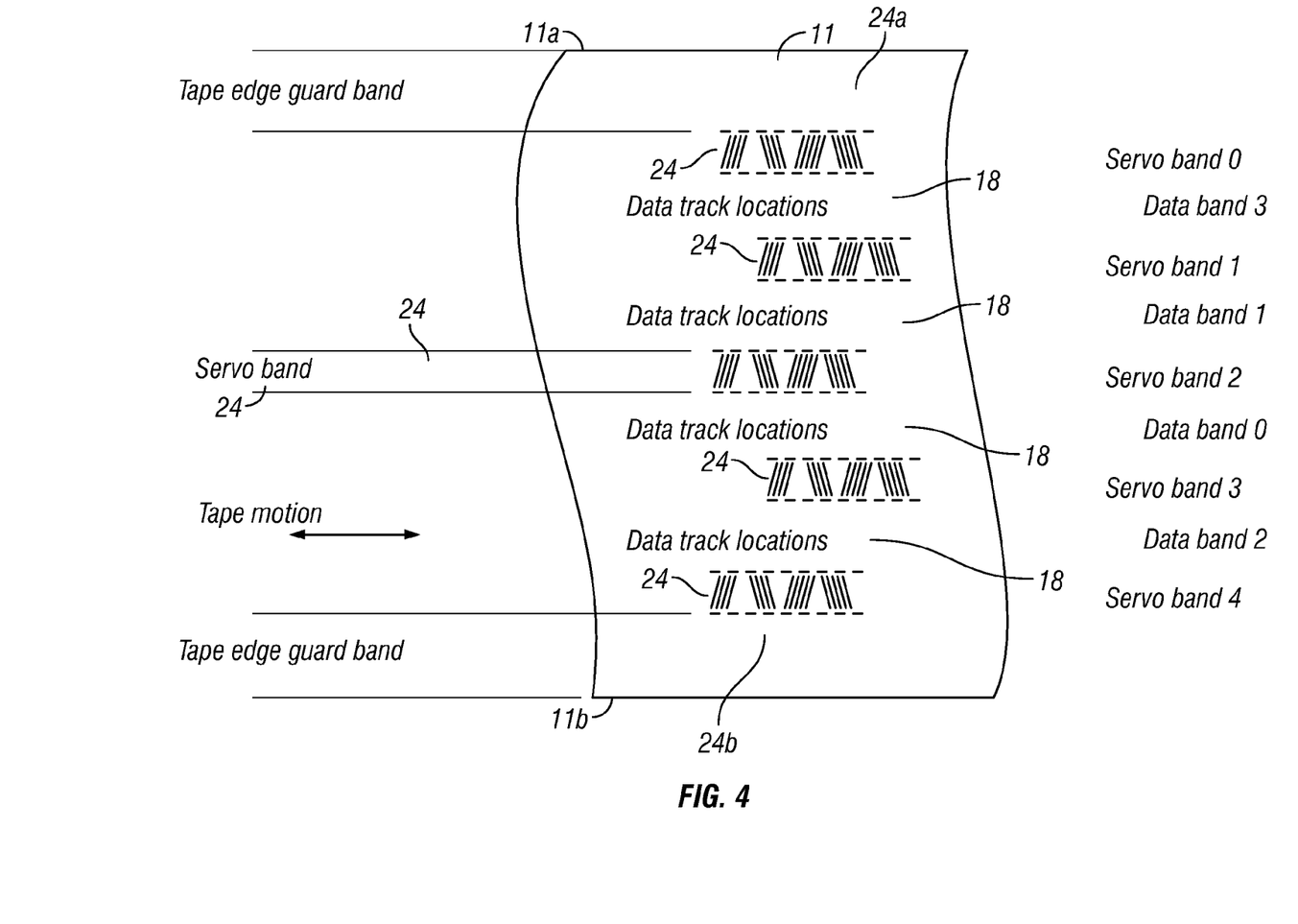
FIG. 4 is a schematic view of a servo format on a magnetic tape.
Figure 5:
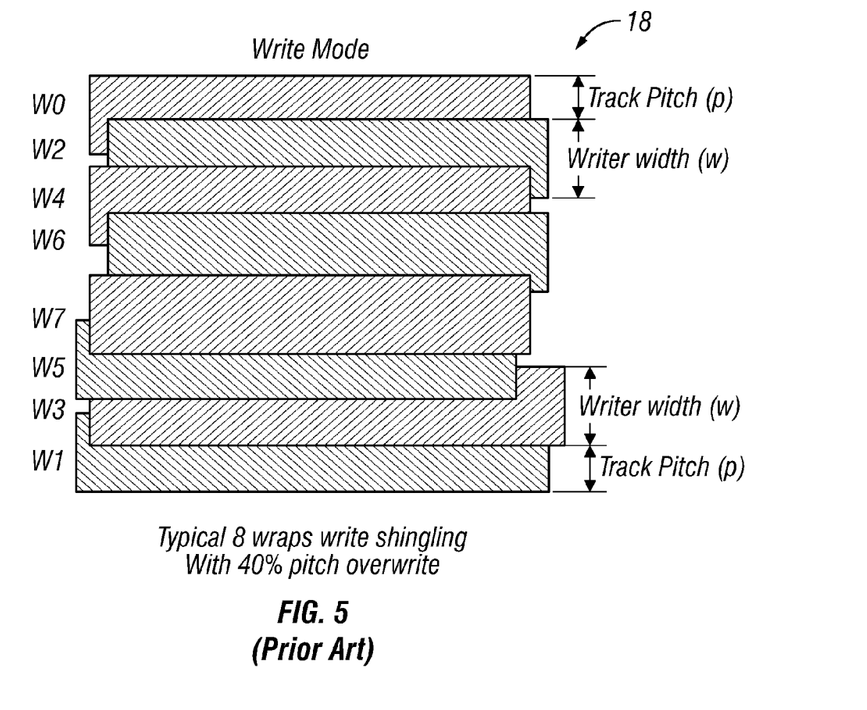
FIG. 5 is a schematic view of a prior art normal shingled track pitch width of written data.

Referring additionally to FIGS. 4 and 5, the magnetic tape 11 is formatted during manufacture with a plurality of servo bands 24 that are parallel to the edges 11a and 11b of the magnetic tape 11. The read/write and servo system 19 of FIG. 3 employs the servo signals 24 as read by servo heads of the read/write and servo head system 65 to position the read/write and servo head system 65 laterally with respect to the magnetic tape and to read or write data from data tracks of the data bands 18. No data is written in tape guard bands 24a or 24b at the tape edges, and the data bands each lies between a set of servo bands 24. The exemplary servo bands illustrate a format of LTO drives, above. In a modern LTO format (e.g. LTO Gen 5), the data of the data band 18 is "shingled", a format in which the track pitch (p) of adjacent tracks is smaller than the data write width (w) of the write head 65. The shingling allows a greater number of tracks to be written in a data band 18. Referring additionally to FIG. 3, the read/write and servo system 19, 17 positions the write head 65 at an index position W0 to write a first "wrap" or set of tracks in the forward direction, then proceeds to move to another index position W1 to write a second "wrap" in the opposite direction, etc. When the wrap at index position W2 is written, the track is shingled, partially overwriting the previously written track at index position W0. Thus, the track shown as W0, when read, is narrower than when it was first written.

Figure 6:
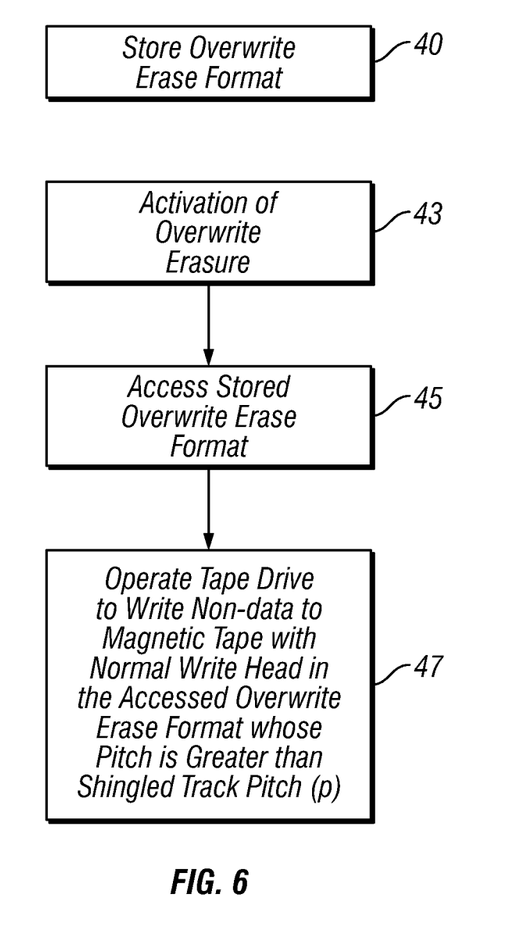
FIG. 6 is a flow chart depicting an embodiment of a method to overwrite erase data of magnetic tape.

FIG. 6 illustrates an embodiment of a method to employ a normal data write head to overwrite erase the data stored on magnetic tape of FIG. 5.

Referring to FIGS. 3, 4, 5 and 6, in step 40, an overwrite erase format is stored in storage 26 of the magnetic tape drive 10. The format comprises at least one non-shingled track pitch longitudinal pattern whose pitch is greater than the shingled track pitch width (p) for normal writing to the magnetic tape 11. The stored pattern additionally comprises an application providing non-data to be written to the magnetic tape as the non-shingled track pitch longitudinal pattern. Examples of non-data comprise a random bit generator, or specific sets of "0" and "1" bit chains of different lengths that are selected by a random number generator, or a specific pattern of bits. The stored non-data will allow the non-data to be written without the involvement of a host system 27.

More than one non-shingled track pitch longitudinal pattern may be stored in storage 26.

The stored pattern(s) may also comprise an instruction for the control 25 to operate the drive system 22 to move the magnetic tape 11 at a higher than normal linear tape speed while writing the non-shingled track pitch longitudinal pattern.

The non-shingled track pitch longitudinal pattern(s) remains stored and is inapplicable during normal use of the tape drive 10. Only in the rare circumstance of the need to erase data, in step 43, is overwrite erasure activated. The activation 43 occurs when a magnetic tape user determines that data stored on the magnetic tape 11 is no longer needed, and there is a security need to destroy or erase the data before relinquishing control over the tape.

The control 25, in response to activation of overwrite erasure of the tape drive of step 43, in step 45 accesses a stored non-shingled track pitch longitudinal pattern from storage 26, and, in step 47, operates the read/write and servo system 19, 17 and the magnetic tape read write head 65 to employ the servo information 24 to write non-data to magnetic tape 11 with the normal data write head 65 in the stored overwrite erase format. If a plurality of overwrite erase formats are stored in storage 26, the user, as part of the activation of overwrite erasure in step 43, selects the desired overwrite erase format. For example, some formats may make the data unusable by a normal magnetic tape read system, but may not completely erase all of the data, and the data to be erased may be so sensitive that another pattern must be used that completely erases all of the data.

Various examples of overwrite erase formats comprising at least one non-shingled track pitch longitudinal pattern whose pitch is greater than the shingled track pitch width (p) are illustrated in FIGS. 7, 8, 9, 10 and 11.

Figure 7:
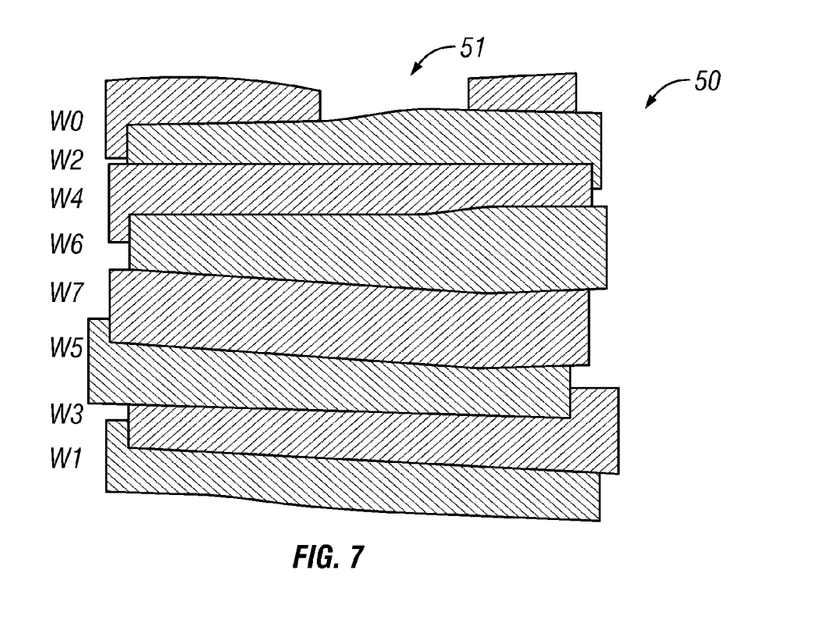
FIG. 7 is a schematic view of an embodiment of an overwrite erase format employing a normal data write head.

In the embodiment of FIG. 7, the pattern 50 is nominally at the same pitch (p) index values as employed in normal writing, but, instead of having tight servo action by the read/write and servo system 19, 17 and an action to stop writing if the tracks being written appear to be moving too far out of the servo path, the non-shingled track pitch longitudinal pattern 50 comprises shingled track pitch (p) index values, and adjusting a stop-write threshold to a value at least twice normal. Thus, the control 25 of FIG. 3 operates the read/write and servo system 19, 17 to adjust a stop-write threshold to a value at least twice normal to thereby allow the paths traced by the written tracks 50 to wander from the nominal index positions and a stop-write occurs only when the adjusted stop-write threshold is hit. In the illustration, a stop-write occurs at position 51 for the track of index position W0. As the result, all of the data tracks are erased by overwriting them. Further, because of the wandering patterns, the non-data doing the overwriting cannot be accurately determined to decode out the non-data, even if the non-data pattern is known or could be determined by someone attempting to read the original data.

Figure 8:
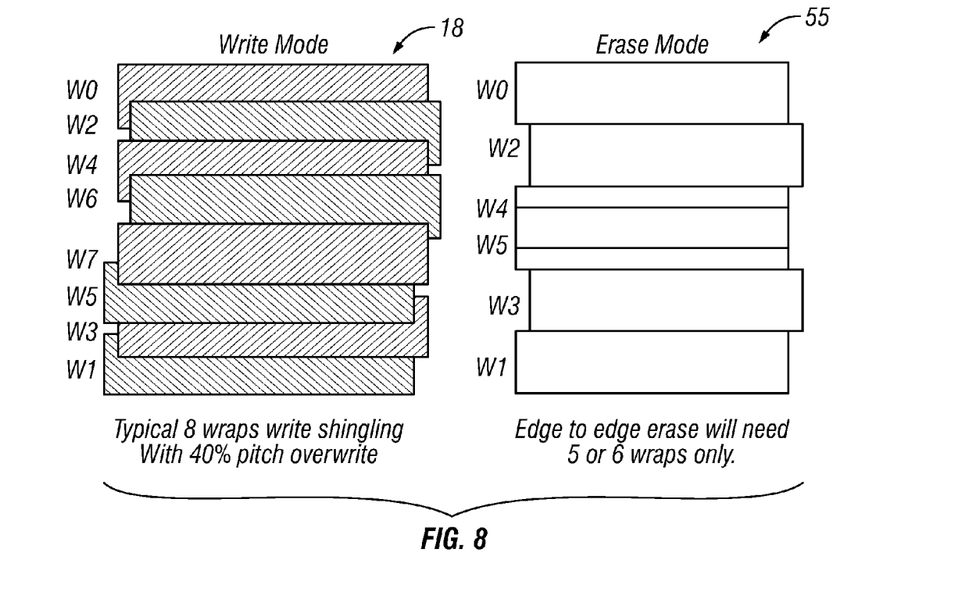
FIG. 8 is a schematic view of another embodiment of an overwrite erase format employing a normal data write head.

The embodiment of FIG. 8 provides a faster overwrite erase by utilizing the full width (w) of the write head 65 of FIG. 3. In the illustration, the normal write shingling 18 at a pitch (p) is compared to the overwrite erase pattern 55 where the non-shingled track pitch longitudinal pattern comprises track pitch index values substantially equal to the write width (w) of the tape drive. The control 25 of FIG. 3 operates the read/write and servo system 19, 17 to write tracks of the data write width (w) of the write head 65 at index values substantially equal to the write width (w), substantially covering all of the originally written tracks, but with fewer wraps. In the example, 6 wraps are written to overwrite erase 55 substantially the entirety of the 8 wraps of the original data 18.

Figure 9:
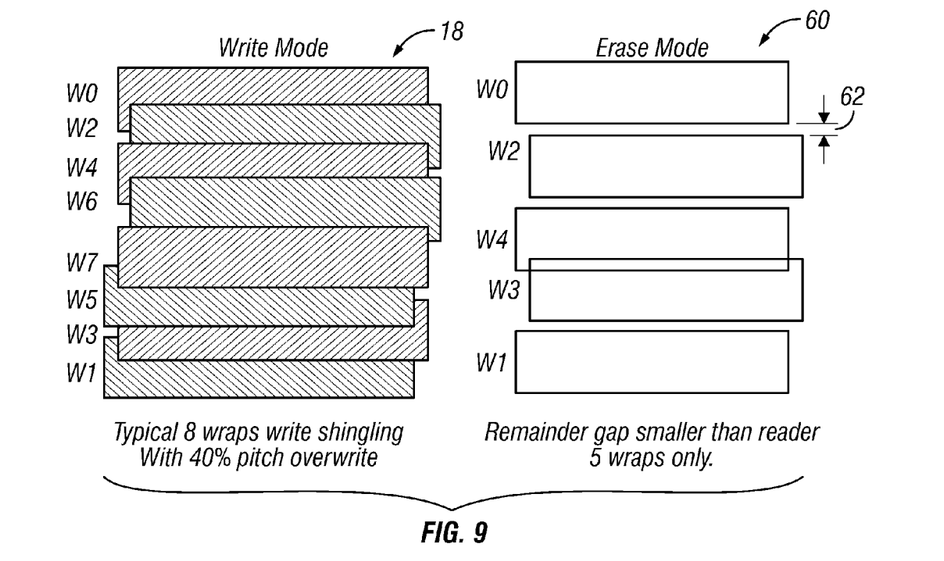
FIG. 9 is a schematic view of still another embodiment of an overwrite erase format employing a normal data write head.

At the risk of exposing some small part of the original data, the embodiment of FIG. 9 provides a still faster overwrite erase by utilizing track pitch index values greater than a write width (w) of the tape drive, up to substantially 1.5 times the write width (w) of the write head 65 of FIG. 3. In the illustration, the normal write shingling 18 at a pitch (p) is compared to the overwrite erase pattern 60 where the non-shingled track pitch longitudinal pattern comprises track pitch index values greater than a write width (w) of the tape drive. The control 25 of FIG. 3 operates the read/write and servo system 19, 17 to write tracks of the data write width (w) of the write head 65 at index values greater than a write width (w) of the tape drive, substantially covering all of the originally written tracks, with a remainder gap 62 smaller than a reader of the head 65, and has still fewer wraps. In the example, 5 wraps are written to overwrite erase 60 substantially the entirety of the 8 wraps of the original data 18. The small remainder gaps 62 are too small to accurately read the original data with a normal read head. There is some risk of exposing some small part of the original data to minute and detailed examination.

Figure 10:
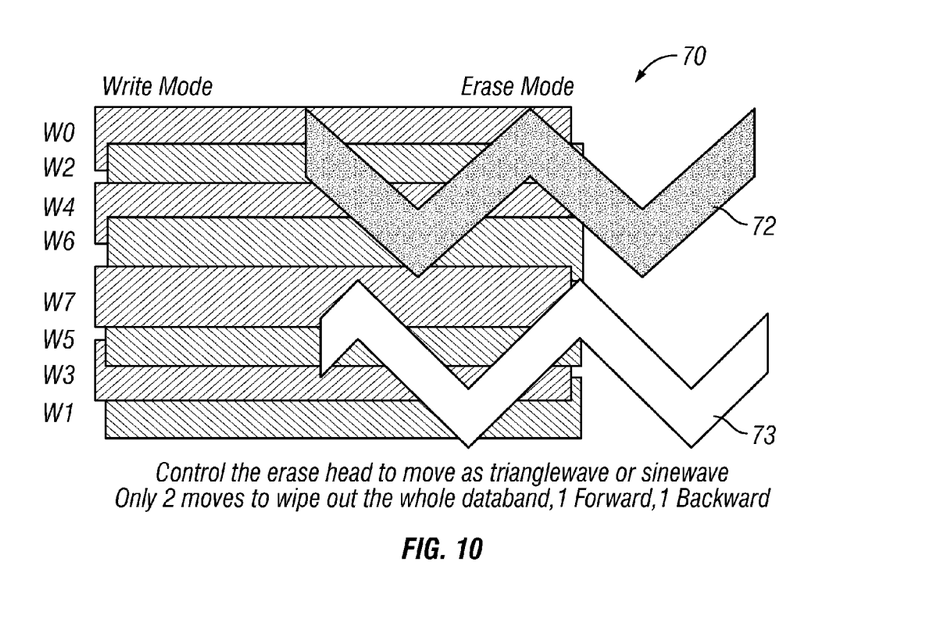
FIG. 10 is a schematic view of another embodiment of an overwrite erase format employing a normal data write head.

The embodiment of FIG. 10 provides a still faster overwrite erase by providing a servo component lateral to the tracks of the magnetic tape. Referring additionally to FIG. 4, the lateral component 70 is limited to maintain the pattern within the data bands 18 of the tracks of the magnetic tape and between the servo bands 24. In one embodiment, the non-shingled track pitch longitudinal pattern lateral component comprises a zig-zag pattern. In another embodiment, the lateral component comprises a sine-wave pattern.

The control 25 of FIG. 3 operates the read/write and servo system 19, 17 to write tracks of the data write width (w) of the write head 65 in the the non-shingled track pitch longitudinal zig-zag pattern or sine-wave pattern, partially covering all of the originally written tracks, and has still fewer wraps. In the example, 2 wraps 72, 73 are written to overwrite erase substantially the entirety of the 8 wraps of the original data 18. The remaining original data is discontinuous and will be difficult to decipher. There is some risk of the remaining original data being subject to minute and detailed examination.

Figure 11:
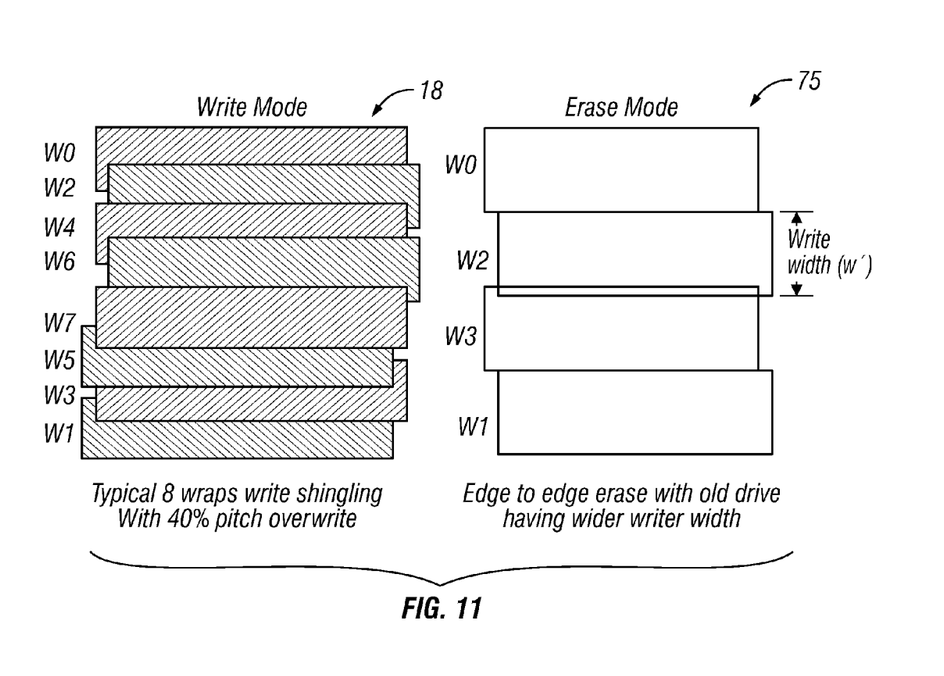
FIG. 11 is a schematic view of an embodiment of an overwrite erase format employing a normal data write head of an older tape drive.

The embodiment of FIG. 11 is similar to that of FIG. 8, but is conducted by an older drive which has a wider full width (w) of the write head 65 of FIG. 3. In the illustration, the normal write shingling 18 at a pitch (p) is compared to the overwrite erase pattern 75 where the non-shingled track pitch longitudinal pattern comprises track pitch index values substantially equal to the wider write width (w') of the tape drive. The control 25 of FIG. 3 operates the read/write and servo system 19, 17 to write tracks of the data write width (w') of the write head 65 at index values substantially equal to the write width (w'), substantially covering all of the originally written tracks, but with fewer wraps. In the example, 4 wraps are written to overwrite erase 75 substantially the entirety of the 8 wraps of the original data 18 which was written at width (w).

The selected non-shingled track pitch longitudinal pattern may also comprise an instruction for the control 25 of FIG. 3 to operate the drive system 22 to move the magnetic tape 11 at a higher than normal linear tape speed while writing to thereby further speed the overwrite erase. The higher speed must be limited to a speed that allows the read/write and servo system 19 to accurately read the servo information 24 of FIG. 4 so as to prevent overwriting the servo information.

The overwrite erase is accomplished by the control 25 of FIG. 3 utilizing the overwrite erase pattern of storage 26 without involving the host system 27 except for possibly providing the pattern(s) in step 40 of FIG. 6 and/or possibly activating the overwrite erasure in step 43. The host system may therefore be released to perform other functions.

A person of ordinary skill in the art will appreciate that the embodiments of the present invention, disclosed herein, including the computer-implemented control 25 for operating the tape drive 10 of FIG. 1 and collecting diagnostic information, and the functionality provided therein, may be embodied as a system, method or computer program product. Accordingly, embodiments of the present invention may take the form of an entirely hardware embodiment, an entirely software embodiment (including firmware, resident software, micro-code, etc.) or a combination thereof, such as an embodiment combining software and hardware aspects that may all generally be referred to herein as a "circuit," "module" or "system." Furthermore, embodiments of the present invention may take the form of a computer program product embodied in one or more non-transitory computer readable medium(s) having computer readable program code embodied thereon.

Any combination of one or more non-transient computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for a tape drive to overwrite erase data recorded in tracks of magnetic tape, comprising:
    said tape drive storing an overwrite erase format, said format comprising at least one non-shingled track pitch longitudinal pattern whose pitch index is at least equal to that of a shingled track pitch (p); and
    in response to activation of overwrite erasure of said tape drive, operating said tape drive to write non-data to magnetic tape with at least one normal write head, said head having a data write width (w) greater than said shingled track pitch (p), in said stored overwrite erase format; and adjusting a stop write threshold to a value at least twice that of a normal write to allow said overwrite to wander.

2. The method of claim 1, additionally comprising operating said tape drive at higher than normal linear tape speed while writing said non-shingled track pitch longitudinal pattern.

3. A method for a tape drive to overwrite erase data recorded in tracks of magnetic tape, comprising:
    said tape drive storing an overwrite erase format, said format comprising at least one non-shingled track pitch longitudinal pattern whose pitch is greater than that of a shingled track pitch (p); and
    in response to activation of overwrite erasure of said tape drive, operating said tape drive to write non-data to magnetic tape with at least one normal write head, said head having a data write width (w) greater than said shingled track pitch (p), in said stored overwrite erase format;
    wherein said magnetic tape comprises longitudinal servo bands separated by data bands of said tracks of said magnetic tape, and said non-shingled track pitch longitudinal pattern comprises a component lateral to said tracks of said magnetic tape, said lateral component limited to maintain said pattern within at least one said data band of said tracks of said magnetic tape.

4. The method of claim 3, wherein said lateral component comprises a zig-zag pattern.

5. The method of claim 3, wherein said lateral component comprises a sine-wave pattern.

6. A magnetic tape drive, comprising:
    a drive system to move a magnetic tape longitudinally;
    a magnetic tape read write head configured to read and to write with respect to said magnetic tape, having a data write width (w) greater than a shingled track pitch width (p) of said magnetic tape;
    a read/write and servo system configured to employ servo band information to position said at least one read write head laterally with respect to said magnetic tape, said read/write and servo system having a stop write threshold to stop writing if tracks being written appear to be greater than said threshold out of a servo path;
    storage configured to store an overwrite erase format, said format comprising at least one non-shingled track pitch longitudinal pattern whose pitch index is at least equal to said normal shingled track pitch width (p); and a control configured to, in response to activation of overwrite erasure of said tape drive, operate said read/write and servo system and said magnetic tape read write head to write non-data to magnetic tape in said stored overwrite erase format; and adjust said stop write threshold to a value at least twice that of a normal write to allow said overwrite to wander.

7. The magnetic tape drive of claim 6, wherein said control additionally operates said drive system to move said magnetic tape at higher than normal linear tape speed while writing said non-shingled track pitch longitudinal pattern.

8. A magnetic tape drive, comprising:

a drive system to move a magnetic tape longitudinally;

a magnetic tape read write head configured to read and to write with respect to said magnetic tape, having a data write width (w) greater than a shingled track pitch width (p) of said magnetic tape;

a read/write and servo system configured to employ servo band information to position said at least one read write head laterally with respect to said magnetic tape;

storage configured to store an overwrite erase format, said format comprising at least one non-shingled track pitch longitudinal pattern whose pitch is greater than said normal shingled track pitch width (p); and a control configured to, in response to activation of overwrite erasure of said tape drive, operate said read/write and servo system and said magnetic tape read write head to write non-data to magnetic tape in said stored overwrite erase format;

wherein said magnetic tape comprises longitudinal servo bands separated by data bands of said tracks of said magnetic tape, and said non-shingled track pitch longitudinal pattern comprises a component lateral to said tracks of said magnetic tape, said lateral component limited to maintain said pattern within at least one said data band of said tracks of said magnetic tape.

9. The magnetic tape drive of claim 8, wherein said lateral component comprises a zig-zag pattern.

10. The magnetic tape drive of claim 8, wherein said lateral component comprises a sine-wave pattern.

11. A computer program product for a magnetic tape drive, said computer program product comprising non-transitory computer-usable storage medium having computer-usable program code embodied therein for a control computer processor to operate said magnetic tape drive, said computer-usable program code comprising:

computer-usable program code to respond to activation of overwrite erasure of said tape drive, to access a stored overwrite erase format, said format comprising at least one non-shingled track pitch longitudinal pattern whose pitch index is at least equal to that of a shingled track pitch (p); and computer-usable program code to operate said magnetic tape drive to write non-data to magnetic tape in said stored overwrite erase format to magnetic tape; and to adjust a stop write threshold to a value at least twice that of a normal write to allow said overwrite to wander.

12. The computer program product of claim 11, additionally comprising computer-usable program code for said tape drive control computer processor to operate said tape drive at higher than normal linear tape speed while writing said non-shingled track pitch longitudinal pattern.

13. A computer program product for a magnetic tape drive, said computer program product comprising non-transitory computer-usable storage medium having computer-usable program code embodied therein for a control computer processor to operate said magnetic tape drive, said computer-usable program code comprising:

computer-usable program code to respond to activation of overwrite erasure of said tape drive, to access a stored overwrite erase format, said format comprising at least one non-shingled track pitch longitudinal pattern whose pitch is greater than that of a shingled track pitch (p); and computer-usable program code to operate said magnetic tape drive to write non-data to magnetic tape in said stored overwrite erase format to magnetic tape;

wherein said magnetic tape comprises longitudinal servo bands separated by data bands of said tracks of said magnetic tape, and said non-shingled track pitch longitudinal pattern comprises a component lateral to said tracks of said magnetic tape, said lateral component limited to maintain said pattern within at least one said data band of said tracks of said magnetic tape.

14. The computer program product of claim 13, wherein said lateral component comprises a zig-zag pattern.

15. The computer program product of claim 13, wherein said lateral component comprises a sine-wave pattern.

\* \* \* \* \*